May 2, 1933.    H. P. SLEEPER    1,906,644
ELECTRICAL TEST STICK
Filed March 15, 1929
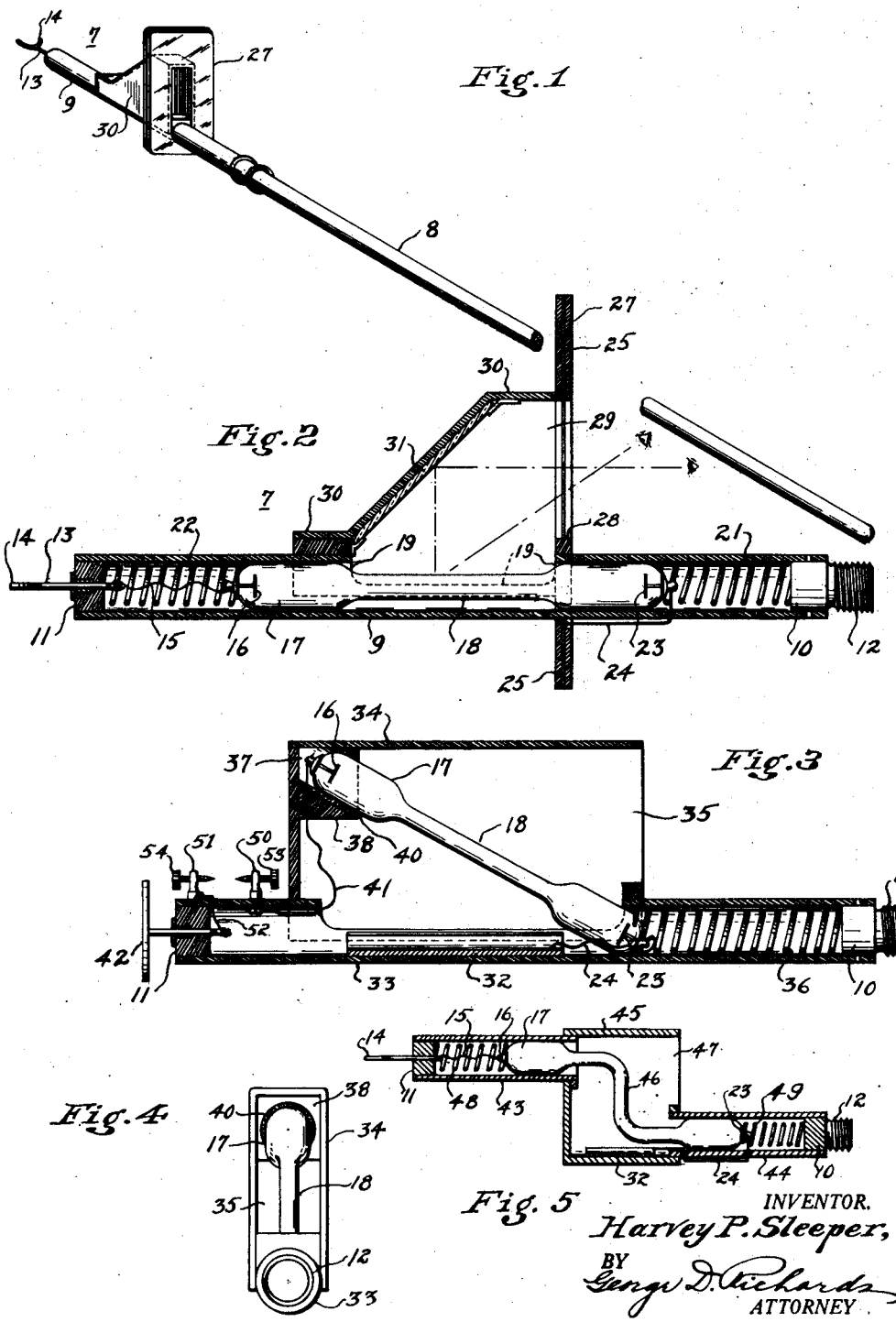
INVENTOR.
Harvey P. Sleeper,
BY
George D. Richards
ATTORNEY.

Patented May 2, 1933

1,906,644

UNITED STATES PATENT OFFICE

HARVEY P. SLEEPER, OF SHORT HILLS, NEW JERSEY

ELECTRICAL TEST STICK

Application filed March 15, 1929. Serial No. 347,230.

This invention relates to means for detecting the presence of electrical energy; and the invention has reference, more particularly, to a novel electrical test stick comprising, a transparent tube filled with a suitable gas normally under reduced pressure such as neon gas contained within a suitable casing and adapted upon application to electrical equipment to detect the presence of alternating current potential on such electrical equipment, such presence being indicated by a glowing of the gas within the transparent tube.

This invention has for its principal object to provide an electrical test stick of the above character which is equipped with means for preventing outside illumination from falling upon the transparent gas containing tube, hereafter termed a neon tube, while at the same time providing ready visibility of such tube by the user thereof.

Another object of this invention is to provide a novel electrical test stick having a neon tube firmly retained within a protective casing so designed that the tube is cushioned and protected against shocks and jars and yet is nevertheless readily visible by the operator from without.

Other objects of this invention, not at this time more particularly enumerated, will be clearly understood from the following detailed description of the same.

The invention is clearly illustrated in the accompanying drawing, in which:—

Fig. 1 is a perspective view of the novel electrical test stick of this invention with an extension handle attached thereto and partially broken away;

Fig. 2 is an enlarged central sectional view of the electrical test stick of Fig. 1;

Fig. 3 is a view similar to Fig. 2, but illustrates a slightly modified form of the invention;

Fig. 4 is a view looking towards the right hand end of the structure shown in Fig. 3; and Fig. 5 is a view similar to Fig. 2, but illustrates a further modified form of the invention.

Similar characters of reference are employed in all of the hereinabove described views, to indicate corresponding parts.

Referring now to Figs. 1 and 2 of the drawing, the reference character 7 designates the electrical tube test stick of this invention as a whole, to which may be attached an extension handle 8. The electrical test stick 7 comprises a substantially hollow cylindrical casing 9 made of suitable insulating material, such as micarta. Two plugs 10 and 11, preferably made of insulating material, are secured within and serve to close the ends of the casing 9. Plug 10 has an exterior threaded portion 12 upon which the socketed end of the handle 8 is adapted to be screwed. Plug 11 is provided with a central aperture through which the shank 13 of an electrical conducting terminal prong 14 extends. The inner end of the shank 13 is formed into an eye, to which is secured one end of a flexible electrical conductor 15 which extends longitudinally within the casing 9 and has its other end electrically connected to an electrode 16 of a neon tube 17. Neon tube 17 extends longitudinally within the casing 9 and has a constricted central portion 18.

When the terminal prong 14 of the electrical test stick is applied to or near a piece of energized electrical equipment, electrical energy from the equipment will flow through this terminal prong and conductor 15 to electrode 16 of neon tube 17. Should the potential and the frequency of the voltage alternations of the electrical energy thus applied to the electrode 16, be of a suitable value, depending upon the characteristics of the neon tube 17, this tube will glow, thereby detecting the presence of such alternating current potential. This glowing of the neon tube 17 is especially pronounced throughout its constricted portion 18, and by providing a slot 19 in the casing 9 opposite the constructed portion 18, such glowing may be observed from without the electrical test stick, thereby enabling the observer to determine the presence of such alternating current potential.

The neon tube 17 is preferably retained in desired longitudinal position within the casing 9 by means of coil springs 21 and 22, which are interposed between the ends of this tube and the plugs 10 and 11. Springs 21 and 22 serve as elastic supports for the ends of the tube 17, and while firmly retaining this tube in desired position within the casing 9, nevertheless, serve to protect the same from shocks and jars which might otherwise result in injury thereto.

A hood 30 is secured to the casing 9 and surrounds slot 19 therein. The hood 30 is intended to prevent outside light from shining upon the constricted portion 18 of the neon tube, which light would render it difficult to observe whether or not the tube was illuminated. The hood 30 has an opening or observation aperture 29 through which the constricted portion of the neon tube may be observed. The electrical test stick 7 while in use is normally held with the terminal prong 14 uppermost, thereby positioning the observation aperture 29 of the hood 30 toward the operator as he grasps the test stick, which location is most desirable, not only for enabling the operator standing below to observe the neon tube, but also because this aperture as thus located prevents the admission of outside light rays which would tend to dim the luminosity of the neon tube and render it difficult for the user to determine whether or not the tube is luminous. A mirror 31 is illustrated as contained within the hood 30 for the purpose of reflecting light rays emitted by the neon tube downwardly and parallel to the electrical test stick, thereby enabling the operator below to readily observe the reflected tube as illustrated in Fig. 2. It will be understood, however, that the mirror 31 may be omitted, in which event the operator's vision will extend angularly and directly to the constricted portion 18 of the neon tube, as also illustrated in Fig. 2. The casing 9 together with the hood 30 form a protective housing for the neon tube 17, and this housing not only prevents breakage of the tube 17 but keeps out interfering outside light rays.

A substantially rectangular sun shield 27 is secured to the hood 30 and has a central rectangular aperture 28 that is aligned with the observation aperture 29 therein. The sun shield 27 as thus applied further assists in the making of the neon tube readily visible to the operator, by shutting off outside light rays which would tend to shine directly into the operator's eyes. This sun shield together with the hood 30 may be made of dark insulating material, such as micarta, and these members provide a black background against which the constricted portion 18 of the tube 17 stands out strongly.

The neon tube 17 is illustrated as having a second electrode 23 which is connected by a conductor 24 to a condenser plate 25. When the electrode 23 together with the condenser plate 25 is used, more capacity current is caused to pass through the gas within the neon tube during use, resulting in greater illumination thereof. The condenser plate 25 is illustrated as contained within the substantially rectangular sun shield 27 made of insulating material, and this condenser plate has a central rectangular aperture aligned with the aperture 29 in the hood 30. Instead of connecting the electrode 23 with a condenser plate 25 contained within the sun shield 27, this electrode may be connected to a condenser plate mounted elsewhere within the electrical test stick, as, e. g. within the tube casing. This is illustrated in Fig. 3, wherein the electrode 23 is connected to a condenser plate 32 extending longitudinally within the tube casing 33.

The structure of Fig. 3 is similar to that of Fig. 2 with the exception that the neon tube 17 is shown inclined with respect to longitudinal axis of the test stick casing 33 and extends partially within this casing and partially within the hood 34. By thus inclining the neon tube 17, the same is rendered more easily visible when viewed through the observation aperture 35 from any angle, thereby eliminating the use of a mirror. A single coil spring 36 is used in the structure shown in Fig. 3, and this spring bears at one end against the plug 10 and at its other end against an end of the neon tube 17. The other end of the neon tube 17 projects into an aperture 37 provided in a bracket 38 that is secured to the inner wall of the hood 34. A lining 40 of cushioning material, such as felt, is positioned between the tube 17 and the walls of the aperture 37. The neon tube 17 is well cushioned within the neon tube test stick of Fig. 3 by the cooperative action of spring 36 and lining 40 and these members also serve to fixedly position this neon tube within the electrical test stick.

The terminal prong 42 of Fig. 3 is illustrated as having the form of a condenser plate which construction is especially desirable when the electrical test stick is to be used for testing high tension apparatus since the capacity of the terminal prong 42 enables the test stick to be held at varying distances from the high tension equipment while testing the latter.

Although the electrode 16 may be connected by a conductor directly to the terminal prong 42 as in Figs. 1 and 2, this electrode is illustrated in Fig. 3 as being connected by a flexible lead 41 to a binding post 50 of a spark gap, the other binding post 51 of this gap being connected to terminal prong 42 by a lead 52. Thumb screws 53 and 54 threaded through binding posts 50 and 51 respectively, enable the adjustment of this spark gap as desired. The presence of this spark gap raises the frequency of the capacity current flowing through the neon tube, thereby enhancing the luminosity thereof. As is well known to those skilled in the art, the discharge of a spark gap is oscillatory in character and of high frequency and as neon tubes are particularly sensitive to high frequency oscillation, the use of the spark gap greatly increases the luminosity of the neon tube in use. Also, by adjusting the thumb screws 53 and 54 so as to vary the length of the spark gap, the impressed voltage necessary to cause the neon tube to glow or function will likewise be varied. Thus it will be seen that the length of the spark gap may also be used as a measure of the potential of the equipment being tested, i. e. the maximum gap at which a given piece of equipment will make the tube glow will be a measure of the potential of such equipment. Also, in testing pieces of high tension equipment in close proximity to one another, if the spark gap were not employed the neon tube might be caused to glow from the induced voltage impressed on one piece of such equipment from another adjacent piece, even though the first piece may be dead. Thus by providing a spark gap, the dead condition of the first piece of apparatus will be detected, since the gap may be set so as to require a potential substantially equal to that normally carried by the dead piece of apparatus to be impressed on the neon tube before the same will glow.

In the modification shown in Fig. 5, the casing is made of two offset parts 43 and 44, which are connected to opposite ends of the hood 45. In this figure, the constricted portion of the neon tube 17 has an offset portion 46 which extends substantially at right angles to the longitudinal axis of the casing so that this tube may be readily visible through the observation aperture 47. The end portions of the tube 17 are longitudinally positioned within the parts 43 and 44 of the casing and retained by means of coil springs 48 and 49 contained within these parts. In this structure also, it is not desirable to employ a mirror, inasmuch as the constricted portion of the neon tube may be readily and directly observed from without. It is obvious that the structure of Figs. 1 and 5 may also be provided with spark gaps, if desired. It will be apparent that the hoods 34 and 45 of Figures 3 and 5 may be provided with the sun shields similar to a sun shield 27 if desired.

In use it is merely necessary for the operator to hold the electrical test stick either directly or by means of the handle 8, so that its terminal prong either contacts with or is positioned adjacent to the electrical apparatus which it is desired to test. In the event that this electrical apparatus is charged with the electrical current of proper characteristics, depending upon the design of the neon tube, this tube will become illuminated, thereby indicating the presence of such charge. The handle 8 is especially valuable in reaching overhead equipment or equipment otherwise not readily accessible, or too dangerous for near approach.

It will be noted that the novel electrical test stick of this invention is of simple and rugged construction and provides a safe mounting for the neon tube which is so arranged as to be readily visible from without.

It will be noted that the use of the insulating handle 8 greatly extends the useful field of the novel electrical test stick of this invention. This will be apparent when it is observed that high tension equipment, which could not be safely approached by use of the electrical test stick alone, may be readily tested when this test stick is used in conjunction with the insulating handle 8. The relatively great length and high insulating qualities which may be incorporated in this handle renders the testing of high tension equipment of any voltage safely possible.

It will be understood that although resilient springs are illustrated as employed for positioning the neon tube within the tube housing, nevertheless, it will be apparent that other means may be employed for so positioning the neon tube, for example, spring clips or cushioning material may be used for this purpose.

In some instance it is desirable to employ a terminal prong having a long shank so that the outer end of the terminal prong will be positioned at some distance from the test stick casing. This enables the neon tube to be positioned close to the operator even though the tested apparatus is some distance away, thereby enabling the operator to readily observe the operation of the tube.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:—

1. An electrical test stick for detecting the presence of alternating current potentials comprising, a housing, an exterior electric terminal on said housing for receiving electro-static energy from a point of alternating current potentials, a spark gap mounted on said housing, a neon tube contained within said housing and having an electrode connected through said spark gap to said terminal, and a condenser plate contained within said housing, said neon tube having a second electrode connected to said condenser plate, the length of said spark gap being adjustable, whereby points of varying alternating current potentials may be tested and compared, the said spark gap also serving to raise the frequency of the capacity current supplied to the neon tube, thereby enhancing the illuminosity thereof, said condenser plate serving to increase the flow of electro-static current to the neon tube by virtue of the electro-static capacity between said condenser plate and the earth.

2. An electrical test stick for detecting the presence of alternating current potentials comprising, a housing, an exterior electric terminal on said housing, said terminal having the form of a condenser plate, a variable spark gap mounted on said housing, a neon tube contained within said housing and having an electrode connected through said spark gap to said terminal, and a condenser plate contained within said housing, said neon tube having a second electrode connected to said condenser plate, said condenser plate terminal serving to provide a relatively large capacity coupling with a spaced point of alternating current potential, said variable spark gap enabling points of varying alternating current potentials to be tested and compared as well as enhancing the illuminosity of the neon tube, said housing condenser plate providing a relatively large capacity coupling with the earth, whereby a relatively large current is caused to flow through said neon tube in use.

In testimony, that I claim the invention set forth above I have hereunto set my hand this 13th day of March, 1929.

HARVEY P. SLEEPER.